Patented Dec. 19, 1939

2,183,590

UNITED STATES PATENT OFFICE 2,183,590

METHOD OF DECOLORIZING OILS

Ernest Wayne Rembert, Plainfield, N. J., assignor to Johns-Manville Corporation, New York, N. Y., a corporation of New York No Drawing. Application May 24, 1934, Serial No. 727,341. Renewed April 2, 1938

1 Claim. (Cl. 196—147)

This invention relates to the art of decolorizing and particularly to an improved decolorizing medium and the method of making the same.

Certain active decoloriizng materials, made by one of several processes, are used in finely divided form as decolorizing media, as, for example, in decolorizing oils by the so-called contact process. There is need also of an active material suitable for use in decolorizing liquids by the percolation process, in which the liquid passes slowly through a deep bed of granules. When it has been attempted to form the active material of finely divided form into granules, there has been difficulty in maintaining the porosity, adsorption efficiency of the granules, and optimum water content of a decolorizing medium and, at the same time, in providing a granule of sufficient firmness to resist crushing under moderate loads. When firmness is obtained by baking at a very high temperature, for example, complete drying as well as partial fusion may result.

It is an object of this invention to provide a granular hydrated decolorizing material combining firmness of granule with inner porosity, optimum water content, and high adsorption or decolorizing power and a method of making the same, as well as finely divided decolorizing material of improved effectiveness.

Briefly stated, the invention comprises the following steps in the method of making an active decolorizing material: the production of a silicate of a multivalent metal by the interaction of a siliceous material and a suitable compound of the selected multivalent metal, in the presence of a carrier or catalyst of the type of a carbonate of an alkali metal used in proportion decreasing with the temperature and/or the time of the said interaction, the proportion of the multivalent metal compound to silica being an optimum for decolorizing efficiency of the product, as will be described later; the provision of finely divided water-insoluble material of gelatinous surface, dispersing the particles in water to give a pasty composition adapted to minimize flocculation, converting the pasty composition to a condition of relatively high viscosity adapted to permit granulation of the composition, granulating it, and then, if the moisture content is substantially above the optimum water content for use of the product in decolorizing oils or the like reducing moisture content approximately to the optimum; in converting the pasty composition mentioned above to granular form, the step which comprises separation of a portion of the water therefrom, as, for example, by partial drying, to convert the paste before granulation to a non-tacky composition adapted to be non-adherent to the granulating equipment used thereupon but adapted, after granulation, to be readily wetted by additional water added thereto and to be dispersed by agitation in water; and, in the drying of the granules, the step which includes reducing the moisture content quickly to the optimum desired in the finished product. whereby shrinkage of the granules and collapse of the structure are minimized. The invention includes also the product of the process described, particularly a decolorizing material comprising magnesia and silica combined in the ratio of 0.4 to 0.8 molecule of magnesia to 1.0 silica and, suitably, also 7 to 18 parts by weight of water to 100 of product. Particularly satisfactory results have been obtained with a ratio of 0.5 to 0.6 molecular proportions of magnesia to 1.0 of silica.

The present invention represents an improvement upon and is particularly applicable to the products and/or methods described in the following applications for U. S. patents: Method of producing reactions with silica and products thereof, Serial No. 529,269, and, Hydrous silicate gels and method of making the same, Serial No. 529,281, both filed April 10, 1931, by the present applicant.

The invention will be illustrated specifically by the following description of the method of making a decolorizing, hydrated magnesium silicate and the resulting product of desired properties.

There is first formed a precipitated magnesium silicate, suitably by the interaction of finely divided silica and a slightly soluble magnesium compound in the presence of a catalyst to accelerate the reaction of the two raw materials. Precipitated basic magnesium carbonate, of type conventionally made for use, in association with asbestos fibers, in so-called 85% magnesia for thermal insulation, is mixed with water, very finely divided silica such as pulverized diatomaceous earth, and a catalyst or reaction accelerator such as sodium carbonate. These materials may be mixed in such proportion as to contain the critical proportions of 0.4 to 0.8 mole of magnesia, suitably 0.5 mole, to 1 mole of silica, and 0.05 mole of sodium carbonate, water being present in the proportion of ½ to 1 gallon of water per pound of total solids. The mixture is caused to react at an elevated temperature, as at 300° F., in an autoclave, with continuous agitation, suitably as described in my said application for U. S. Patent, Serial No. 529,269, until the reaction is substantially complete.

The concentration of sodium carbonate present during the reaction should be selected carefully, to avoid a concentration so low as not to accelerate satisfactorily the interaction of the magnesia compound and the silica and, on the other hand, to avoid a concentration so high as to leave an excessive amount of soluble silicate in the finished product. In general, the concentration of sodium carbonate or like catalyst present in the aqueous solution may be less for relatively higher temperatures (steam pressures) and longer periods of reaction than for lower temperatures and shorter periods. Thus the concentration, expressed as parts of sodium carbonate for 1,000 parts by weight of water required to give products of comparable efficiencies, may be as low as 0.4 when the reacting mixture is autoclaved at 100 to 200 pounds gauge steam pressure per square inch for 1 hour's time, 2.5 for 50 pounds and 2 to 4 hours, and 10.0 for 25 pounds and 2 to 4 hours.

The reacted product contains a high proportion of hydrated magnesium silicate in the form of a pseudomorph corresponding roughly to the shape and size of the particles of basic magnesium carbonate initially used. These pseudomorphic aggregations of precipitated magnesium silicate contain particles that are individually very fine and amorphous, in a mixture with the excess of water originally used.

The aqueous mixture made as described above is next subjected to treatment to remove a large part of the excess water. Suitably, this water is separated mechanically, as by filtration on a continuous vacuum filter or other equipment, to form a filter cake or non-fluent mass. The filter cake is washed to remove water-soluble material. When the precipitation has been made in an alkaline solution of alkalinity, at the end of the precipitation, corresponding to at least that given by approximately one-tenth normal to normal solutions of sodium carbonate, the washed cake may be dried to the optimum moisture content specified below and milled to grade desired.

But, to obtain the maximum decolorizing property in the finished product and adapt the product to satisfactory revivification subsequent to use in decolorizing operations, it is desirable to neutralize approximately the mixture containing the precipitate. In effecting this neutralization, the washed filter cake is removed from the filter, dispersed in water to form a slurry, and is then treated with dilute acid, say with sulphuric acid of concentration 5 parts by weight of the acid to 95 parts of the water. The dilute sulphuric acid is stirred into the slurry in amount sufficient to make the resulting mixture neutral to litmus.

The thus neutralized material may be again filtered, washed, dried and milled to produce a decolorizing material suitable for use in the contact method of decolorizing oils.

When it is desired to produce a granular material suitable for use in the percolation process of decolorizing oils, a special procedure is used to offset undesirable effects upon the ultimate granules of the neutralization step described above and to insure satisfactory weight and firmness of the granules of finished product. In this special procedure the neutralized and washed filter cake is removed from the filter and subjected to vigorous agitation, as, for example, in a Day mixer including a mixing vessel and a pair of spaced rotated agitator arms. The agitation is made generally without the addition of additional water to the wet filter cake and there is obtained deflocculation of the solid particles in the water present, to produce a pasty or relatively non-fluent composition adapted to minimize flocculation of the relatively, fine water-insoluble particles of gelatinous surface dispersed therein, possibly partly because of the viscous nature of the composition.

In converting the paste into granules, the deflocculated, pasty mixture is formed into a thin shape and subjected to partial drying. For example, the deflocculated mixture, including magnesium silicate dispersed in water, is caused to flow under pressure through a horizontal extrusion slit in the form of a stream of substantial width and little thickness, say 1 inch, and onto a conveyor belt. The conveyor belt and paste carried thereby are passed through a dryer maintained at an elevated temperature. Thus, the thin sheet of material may be subjected to a temperature of 212° F. for a period of time that is preferably short, say less than 1 hour, to lower the moisture content of the material in the sheet to approximately 35 to 45% by weight, the moisture content of the exterior surfaces of the sheet being not below 25%. It has been found that a material so dried possesses a combination of desirable properties. Because of the low proportion of water present, the material is non-tacky and is adapted to be sent through granulating equipment, as described below, without excessive adherence to the equipment. On the other hand, the resulting granules contain sufficient water to be adapted to be readily wet when additional water is applied thereto and then dispersed by agitation in the water so applied, in the form of individual particles originally formed in the reaction.

The material thus dried is sent to granulating equipment which may include a crusher and a series of screens and accessories for separating out particles of desired size, returning oversized particles to the crusher for further crushing, and returning undersized fine particles to a new bath of the aqueous, non-fluent mass or filter cake described above. The undersized or fine particles mixed with the non-fluent mass are dispersed therein, like so much fresh material, and the deflocculated mass is again formed into a thin shape, subjected to partial drying, further granulation, return of the fines for dispersion, and so on, until substantially all the fine particles are obtained in the form of granules of desired size. Such a desired size is represented by particles which will pass through a 15 to 30-mesh screen and be retained on a 30 to 60-mesh screen. Granules of such size, that are coarser than 60-mesh, combine the desirable properties of large exposed surface, high decolorizing efficiency, ready percolation of oil therethrough, and adequate strength.

Finally, the granules of desired size are subjected to additional drying, that is, are incompletely dehydrated, to reduce the moisture content to the optimum proportion and develop the maximum adsorptive properties for use in decolorizing liquids. This final drying, also, should be done in a limited time and, preferably, very quickly, say in 5 to 15 minutes, to minimize shrinkage with attendant collapse of structure and closing of the pores. In this manner the structure and porosity are preserved. This final drying may be accomplished by suspending the granules in an air stream at a temperature of approximately 200 to 250° F. and then separating them from the air stream, as in cyclonic separators. The atmosphere of drying should be relatively humid, to avoid skin hardening. The granules may be dried to approximately 8 to 11% by weight of water.

The equipment described above is an assembly of parts that are conventional. Since the equipment forms no part of the invention, its illustration by drawings is considered unnecessary.

The deflocculation step in the method of manufacture of granules is useful in increasing not only the firmness or strength of the granules finally produced, but also their density. Thus a filter cake of flocculated material of such moisture content as to give a finished product of an overall apparent density of 17.5 pounds to the cubic foot, if made from neutralized material without deflocculation, may have a density approximately 50% higher, say 25 to 27 pounds to the cubic foot, if made similarly but with deflocculation included. This increases in the density or weight of material that may be filled into a tower, for example, is especially important since the inner porosity of the granules and the efficiency of the material per unit weight is retained in the final product. From filter cakes of lower water content, there have been made finished products of apparent density as high as 35 pounds to the cubic foot.

It has been found that the moisture content of the finished product should be adjusted, for best results in decolorizing petroleum oil, for example, according to the temperature at which the product is to be used. With colored, heavy petroleum fractions corresponding to neutral oils, it has been found desirable to use a decolorizing material made as described and containing eighteen or more parts of water to 100 parts by weight of total decolorizing material for decolorizing oil at temperatures above 400° F., 12 to 18 parts of water for decolorizing at 200 to 400° F., and 6 to 12 parts of water for decolorizing at temperatures below 200° F. In general, the proportion of water present in a decolorizing medium should be lower, within the limits set above, the lower the temperature at which the medium is to be used in decolorizing an oil.

Since the granular product is adapted for use primarily in percolation at relatively low temperatures, a product of the moisture content within the higher ranges specified is useful particularly in the products of fine sizes of particles adapted for use at relatively high temperatures in the contact process. Granules, for use in percolation, say at a temperature of 212° F. or lower, should be dried to a water content so low that generation of bubbles of steam and consequent foaming will not be produced during the percolation. Thus the granules may be dried to a moisture content of 8 to 11%, as stated.

The particles of material made in accordance with this invention are individually very fine and amorphous. In the granular product, the fine particles are aggregated but the granules present collectively a relatively large surface for adsorption. Such granules contain pores extending into the interior and communicating with an exposed surface of the granule and rendering the interior of the granule accessible or available to liquids that are to be decolorized. The granules are resistant to crushing under moderate load, adapted, for example, to support the weight of overlying granules when used in a system of decolorizing by percolation, as will be described later, and resistant to abrasion during use, steaming, revivification, handling or conveying.

When additional strength of particles is required, a limited proportion, say 5% by weight, of bentonite or like gelatinous, colloidal material may be added to the magnesium silicate paste prior to the extrusion described. The extruded material is then finished in regular manner.

The high quality and effectiveness of the product may be demonstrated by the following convenient method of decolorizing an oil by the contact method: The oil to be decolorized is agitated with the decolorizing material in finely divided form, at a selected temperature. Thus a neutral Pennsylvania petroleum stock may be decolorized by being contacted for a few minutes with the decolorizing medium of water content of 18% or more, at a temperature above 400° F.; with medium of water content of 12 to 18%, at 220 to 400° F.; and with medium of water content of 6 to 12%, at 100 to 220° F. For decolorizing oils at temperatures below 160° F., particularly good results have been obtained with a decolorizing medium containing 9 to 11% of water. After a conventional period of contact, say a few minutes, the mixture is filtered to separate the decolorizing medium.

My improved material in granular form may be used also for decolorizing oils by the percolation process, which has not been heretofore successful with precipitated or synthetic decolorizing materials. In decolorization with my material, usual equipment may be used, including a tower. This tower is filled with the granular decolorizing material to a depth of say 20 feet and the oil to be decolorized is caused to percolate slowly through the bed of granules at a selected temperature, as, for example, 200° F.

The product made as described above is very satisfactory for decolorizing oils. The material, as produced, gives effective decolorization. Also it is effective in treating a volume of oil per unit weight of decolorizing material that is large in comparison with previously used decolorizing materials. Furthermore, the improved products of the present invention are particularly adapted to revivification subsequent to use. The revivification may be made at an elevated temperature in conventional equipment, in which operation the refractoriness of the material as compared with fuller's earth, for example, is an advantage. However, the fact that my improved material is adapted to retain a very high proportion of combustible impurities, before revivification is necessitated, increases to an undesirable degree the temperature which may be produced, in the product undergoing revivification, by the combustion of the high proportion of impurities present. To minimize the hazard of over heating during revivification, the revivification is preferably conducted in a combustion supporting medium of lower oxygen content than obtains in air. Thus, the combustion of the organic matter may be conducted in a mixture of air and diluent, such as flue gas and/or steam, the proportion of inactive diluent to air being adjusted, as will be obvious to one skilled in the art, to lower the temperature in the revivification furnace to a point below that of undesirable slagging or shrinkage of the decolorizing material being revivified. I have found a satisfactory proportion of diluent to be that which maintains the decolorizing material at about 1,000 to 1,100° F. during revivification.

In typical tests, my decolorizing medium has been found one and one-half to five times as effective as fuller's earth, in the amount of oil that may be decolorized to a given standard of color by a given quantity of decolorizing medium.

The term "precipitated" is used herein to define material produced directly in the solid state by a chemical reaction in an aqueous medium in contrast to a material produced, for example, by fusion. Such precipitated material contains very fine particles, is particularly adapted for the present purposes, and is to be distinguished from naturally occurring, less effective decolorizing materials.

While the invention has been illustrated by the example of hydrated magnesium silicate, the step of deflocculation, for example, may be applied to other finely divided solids adapted to be hydrated to a gel on treatment with water.

Decolorizing media may be formed, as described, of other multivalent metal silicates; or similar compounds that are water-insoluble and adapted to have adequate adsorptive and decolorizing properties may be used, particularly silicates of aluminum or other amphoteric metals or of the alkaline earth metals. In making compounds other than magnesium silicate, there should be followed the method illustrated in the case of magnesium silicate, with the substitution of proper raw materials for those described, or a method given in the said pending applications supplemented by the novel steps described herein. Thus, in making aluminum silicate, the initial step may comprise the interaction of an aluminum compound that is at least slightly soluble, suitably aluminum hydroxide, with a solution of a silicate in water, to form a precipitate of aluminum silicate. It is desirable to establish at the outset alkalinity corresponding to that of 0.1 to 0.5 normal sodium hydroxide solution, to avoid excessive hydrolysis. Once the silicate is precipitated, it is finished by the method described herein. The carrier, such as carbonate of sodium or potassium, is used when the siliceous material used is not very soluble in water, as is the case when the material is silica.

Satisfactory results have been obtained also by blending natural and precipitated decolorizing materials. Thus, equal weights, on the dry basis, of fuller's earth or of an acid-treated, washed and neutralized clay of good decolorizing power and of magnesium silicate, produced as above described, are made jointly into a paste, deflocculated, and finished in the manner described, to give a product of optimum moisture content, say 9 to 11%, for use in decolorizing oils at 160° F. In such a mixture, the component ingredients are intimately associated and coact to give a product of a high degree of strength, porosity, and activity as a decolorizing material, at a cost that is relatively low for the quality obtained.

The details that have been given are for the purpose of illustration and not restriction. Many variations therefrom may be made within the scope of the appended claim.

What I claim is:

In a method of decolorizing oils involving mixing therewith a hydrous, precipitated, absorbent magnesium silicate, heating the mixture, and separating the silicate and adsorbed decolorizing constituents from the oil, the improvement which consists in adjusting the moisture content of the silicate to a quantity predetermined in accordance with the temperature to which the mixture is treated, said moisture content being adjusted to a minimum of 18% by weight of the silicate for treatments at temperatures in excess of 400° F., and to a content of 12 to 18% for treatments at 220 to 400° F., and 6% to 12% for treatments at temperatures between 100 to 220° F.

ERNEST WAYNE REMBERT.